(12) United States Patent
Lipton et al.

(10) Patent No.: US 8,493,433 B2
(45) Date of Patent: Jul. 23, 2013

(54) SHUTTERING EYEWEAR FOR USE WITH STEREOSCOPIC LIQUID CRYSTAL DISPLAY

(75) Inventors: Lenny Lipton, Los Angeles, CA (US); Joseph Chiu, Pasadena, CA (US)

(73) Assignee: RealD Inc., Beverly Hills, CA (US)

( * ) Notice: Subject to any disclaimer, the term of this patent is extended or adjusted under 35 U.S.C. 154(b) by 516 days.

(21) Appl. No.: 11/519,357

(22) Filed: Sep. 12, 2006

(65) Prior Publication Data
US 2008/0062259 A1 Mar. 13, 2008

(51) Int. Cl.
*H04N 13/00* (2006.01)
*H04N 13/02* (2006.01)
*H04N 13/04* (2006.01)

(52) U.S. Cl.
USPC ............ 348/42; 348/43; 348/44; 348/45; 348/61; 351/49

(58) Field of Classification Search
USPC ........................... 348/5–601; 351/49
See application file for complete search history.

(56) References Cited

U.S. PATENT DOCUMENTS

| | | | | |
|---|---|---|---|---|
| 2,005,426 A * | 6/1935 | Land | ............................ | 351/49 |
| 4,792,850 A * | 12/1988 | Liptoh et al. | .................... | 348/57 |
| 5,442,467 A * | 8/1995 | Silverstein et al. | ........... | 349/159 |
| 5,481,321 A * | 1/1996 | Lipton | ............................ | 352/57 |
| 5,821,989 A * | 10/1998 | Lazzaro et al. | ................. | 348/56 |
| 5,917,562 A * | 6/1999 | Woodgate et al. | ............... | 349/15 |
| 6,046,787 A * | 4/2000 | Nishiguchi | .................... | 349/129 |
| 6,046,849 A * | 4/2000 | Moseley et al. | ............... | 359/465 |
| 6,115,177 A * | 9/2000 | Vossler | .......................... | 359/465 |
| 6,222,672 B1 * | 4/2001 | Towler et al. | ................. | 359/465 |
| 2003/0089956 A1 * | 5/2003 | Allen et al. | .................... | 257/432 |
| 2006/0256260 A1 * | 11/2006 | Gon et al. | ........................ | 349/96 |
| 2006/0256287 A1 * | 11/2006 | Jacobs | ............................ | 352/85 |
| 2006/0268104 A1 * | 11/2006 | Cowan et al. | .................... | 348/42 |

OTHER PUBLICATIONS

International Search Report and Written Opinion for PCT?US07/19466 mailed Oct. 16, 2008.
International Preliminary Report on Patentability in co-owned PCT/US07/19466 dated Apr. 13, 2011.

* cited by examiner

*Primary Examiner* — Chikaodili E Anyikire
(74) *Attorney, Agent, or Firm* — Baker & McKenzie LLP (57) ABSTRACT

An active eyewear method and system for viewing stereoscopic images is provided. The eyewear comprises polarization altering elements, such as twisted nematics or super twisted nematics, configured to receive light energy and rotate the polarization of light energy passing therethrough, and linear polarizers having polarization axes oriented in substantially identical orientations orthogonal to the first axis of polarization. The linear polarizers receive light energy from the polarization altering elements. The method comprises transmitting light energy through a sheet polarizer having an first axis of polarization, receiving the light energy with two polarization altering elements, each polarization altering operating out of phase with the other and in synchrony with a video field rate associated with the transmitting, and passing the light energy through two linear polarizers having substantially identical axes of polarization orthogonal to the first axis of polarization.

26 Claims, 5 Drawing Sheets

SHUTTERING EYEWEAR FOR USE WITH STEREOSCOPIC LIQUID CRYSTAL DISPLAY

BACKGROUND OF THE INVENTION

1. Field of the Invention

The present design relates generally to the art of field-sequential stereoscopic liquid crystal display, and more specifically to shuttering eyewear used in conjunction with liquid crystal displays that enable enhanced image brightness and resolution, as well as ease of viewing.

2. Description of the Related Art

Current stereoscopic display systems most often employ individual eyewear selection devices for proper image viewing. Selection devices employed with these systems are either active (shuttering) or passive (polarizing) eyewear. People working in molecular modeling and in certain CAD presentation applications tend to prefer using active eyewear selection devices. People working with geographic information systems, including measurement and aerial mapping applications, tend to favor a passive eyewear solution.

Active selection devices provide shuttering functionality within the eyewear. When an observer looks through shuttering eyewear, his or her entire visual field is subjected to a duty cycle, or to shuttering. When an observer looks through passive eyewear, no shuttering occurs in the non-monitor visual field, but instead the combination of the eyewear and the monitor's electro-optical modulator creates the shuttering functionality of the display. Because the non-monitor visual field is not subjected to a shuttering duty cycle, a lower field rate may be used since there is no opportunity for brightly lit environments to flicker under such circumstances.

Field rate is related to the frame rate, where the field rate for conventional television displays for an interlaced video image is two times the frame rate. Interlacing provides one half of the image to the display at a time, normally broken into odd and even numbered lines. A field rate of 90 Hz corresponds to a 45 frame per second video image. While interlaced signals may have more than two fields per frame, no such signal is commonly employed.

One design of a current stereographic display system that exhibits the lower field rate advantage is realized using a passive eyewear selection device in conjunction with a liquid crystal modulator such as StereoGraphics Corporation's ZScreen®. The ZScreen is a liquid crystal modulator described by Lipton et al. in U.S. Pat. No. 4,792,850, and first manufactured by StereoGraphics Corporation. In this design, the modulator serves to change the characteristics of polarized light at the video field rate such that a sequence of fields having alternatively left- and right-handed circularly polarized light are emitted by the modulator/monitor combination. The left and right images are encoded with a polarization characteristic that may then be decoded by the passive eyewear consisting of a circularly polarizing analyzer for the left and right eyes respectively. The passive eyewear described in the above configuration may also be used in conjunction with planar monitors or other stereoscopic monitors that are not necessarily "genlocked," or field rate synchronized, to, or in phase with, the stereoscopic monitor. Genlocking is employed since, unlike active eyewear, no shuttering occurs when a user looks at planar monitors, and these monitors cannot exhibit unwanted and disturbing flicker.

The major reason a lower field rate implementation is advantageous is because of the relationship between field rate and effective resolution. The lower the field rate, the higher the effective resolution of the stereoscopic display system. This relationship is a result of a display/monitor device, including Cathode Ray Tubes (CRTs) in particular, having a fixed bandwidth that limits the number of pixels per unit of time can be written. Stereoscopic display systems operating at a higher field rate tend to limit or lower the number of pixels that can be written for a field or frame, and consequently yield a decrease in resolution. Thus, it may be advantageous in certain applications to operate at a lower field rate to produce a higher resolution image provided that perceived flicker is not increased.

In practice, using a CRT monitor with passive eyewear, a field rate as low as approximately 90 fields per second may produce a satisfactory viewing experience with minimal or zero flicker. In comparison, a satisfactory viewing experience using active or shuttering eyewear requires a significantly higher rate of 120 fields per second. The increased field rate associated with use of shuttering eyewear is necessary to prevent the room environment surrounding the monitor from exhibiting flicker. If shuttering eyewear is used to view stereoscopic images in a bright room at anything less than approximately 120 Hz, room environment flicker will occur. These field rate ranges apply to liquid crystal displays as well.

Shuttering eyewear may become problematic when used in a viewing area containing displays or monitors that are not genlocked to the stereoscopic monitor. Such shuttering eyewear employed in these conditions may produce roll bars or other disturbing visual effects. Such visual effects result where these shutter mechanisms are not synchronized to the planar video sources present.

Passive eyewear solutions are typically employed with an onscreen polarization modulator or switch, and the only shuttering occurs on the display screen. Passive eyewear solutions do not produce shuttering effects when the user views the rest of the visual field or room environment. Therefore, use of passive eyewear in room environments may have a significant advantage over active eyewear designs.

In contrast, passive eyewear designs may become problematic as image viewing screen size increases above 20 inches. Onscreen modulators that are typically constructed with pi-cells or surface-mode devices become costly in large sizes. Onscreen modulators having dimensions larger than 12×16 inches may be employed (this size is suitable for a 19- to 21-inch monitor). If modulators or monitors of a larger size are desired, i.e. larger than 20 inches, the cost of the selection device increases dramatically.

It would therefore be beneficial to provide a stereoscopic display system for use in conjunction with viewing stereoscopic images that overcome the foregoing drawbacks present in previously known active eyewear designs and retains the good characteristics of onscreen modulation. Further, it would be beneficial to provide an active eyewear design that exhibits a lower field rate and higher effective resolution than found in passive eyewear solutions. It would also be advantageous to provide active eyewear having an appreciable cost savings over previously known eyewear designs requiring expensive modulators constructed of pi-cells.

SUMMARY OF THE INVENTION

According to one aspect of the present design, there is provided partial active shuttering eyewear employed to view stereoscopic images on a liquid crystal (LC) display monitor. Such eyewear using partial or distributed shutters employ LC shutters of the twisted nematic, super twisted nematic, pi-cell, or other types of designs, but distributes portions of the shutter components, such as polarizers and retarders, between the eyewear shutters and the display screen to produce a brighter and/or higher resolution result.

According to another aspect of the present design, there is provided eyewear for viewing stereoscopic images, the eyewear comprising polarization altering elements, such as twisted nematics or super twisted nematics, configured to receive light energy and rotate the polarization of light energy passing therethrough, and linear polarizers having polarization axes oriented in substantially identical orientations orthogonal to the first axis of polarization. The linear polarizers receive light energy from the polarization altering elements.

According to a third aspect of the present design, there is provided a method for viewing stereoscopic images comprising transmitting light energy through a sheet polarizer having an first axis of polarization, receiving the light energy with two polarization altering elements, each polarization altering operating out of phase with the other and in synchrony with a video field rate associated with the transmitting, and passing the light energy through two linear polarizers having substantially identical axes of polarization orthogonal to the first axis of polarization.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

According to the present design, there is provided an active shuttering eyewear arrangement that incorporates features and functionality similar to today's passive eyewear designs. In these designs a "partial" shutter is employed, so termed because only some of the traditional shutter ensemble components are employed at the eyewear themselves.

Field-sequential stereoscopic displays have been used for more than two decades in conjunction with cathode ray tube (CRT) monitors and as applied to various scientific, engineering, and technical visualization tasks. The two basic traditional approaches, shown in FIGS. 1A and 2A, use temporal multiplexing for different but closely related selection device technologies. The difference between these two approaches is primarily the shuttering means for image selection. There are two approaches: one using active shuttering eyewear as illustrated in FIG. 1A, and the other using passive eyewear as illustrated in FIG. 2A.

Figure 1B:
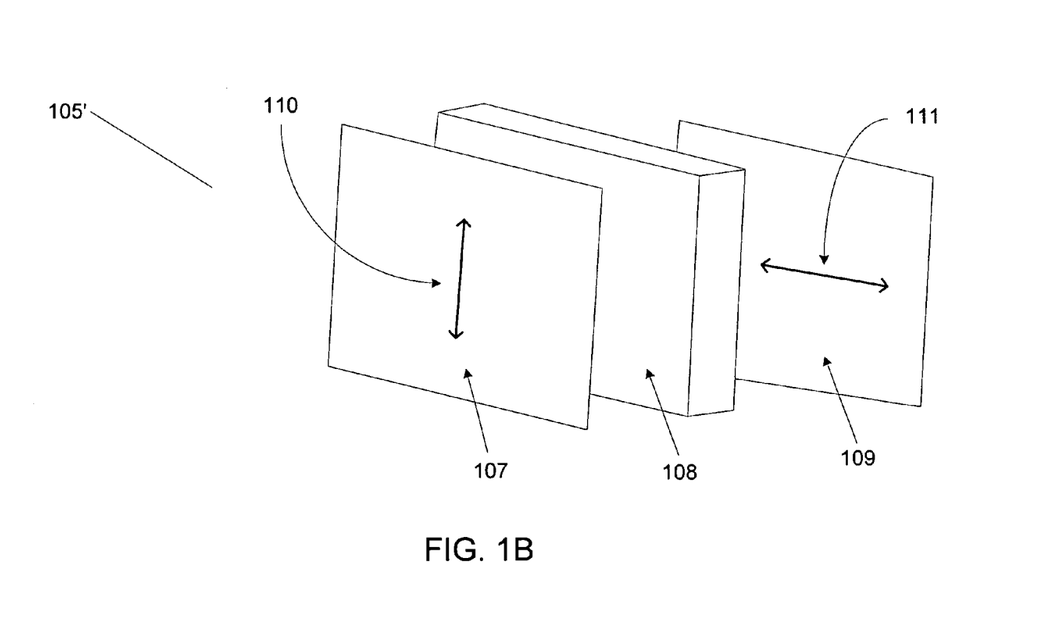
Figure 2A:
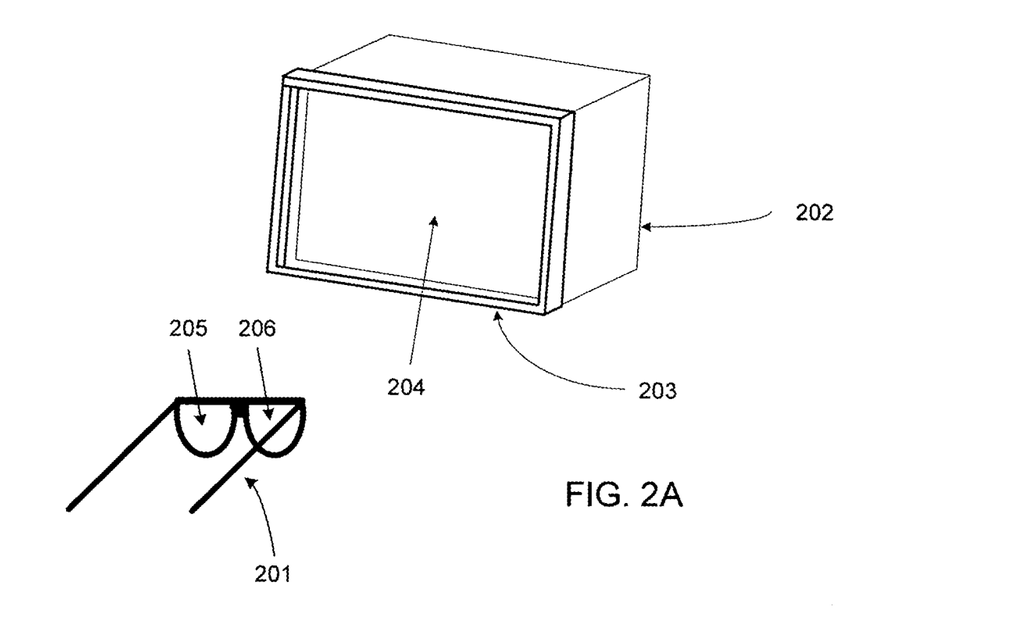
FIGS. 2A and 2B illustrate current selection device technology using passive eyewear.
Figure 2B:
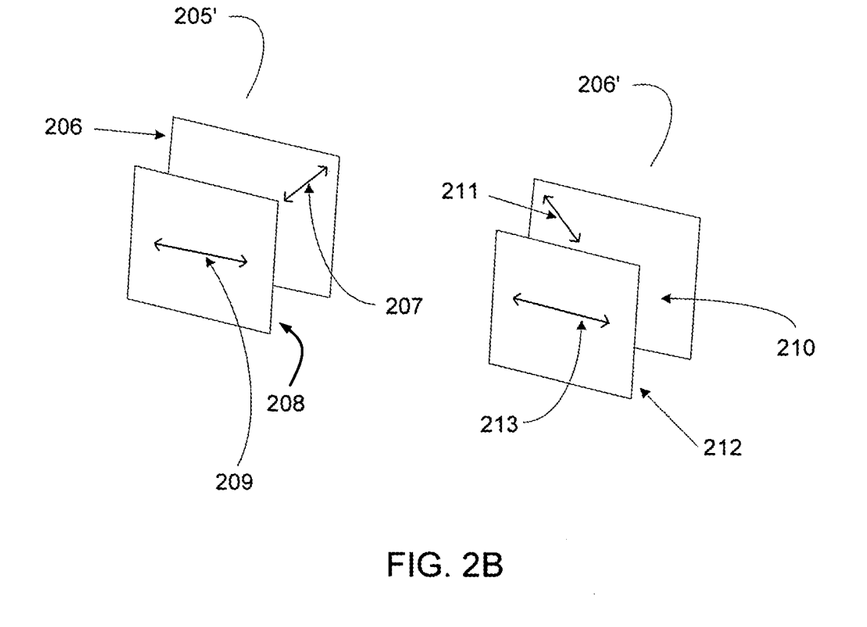

The first approach using shuttering eyewear does not require a ZScreen or similar on-screen polarization modulator but the second using passive polarizing eyewear does. Both approaches use the identical time-multiplex or field-sequential image format and images are prepared independently with regard to the selection device employed. FIGS. 1B and 2B illustrate exemplary constructions of the selection devices associated with each approach.

Figure 1A:
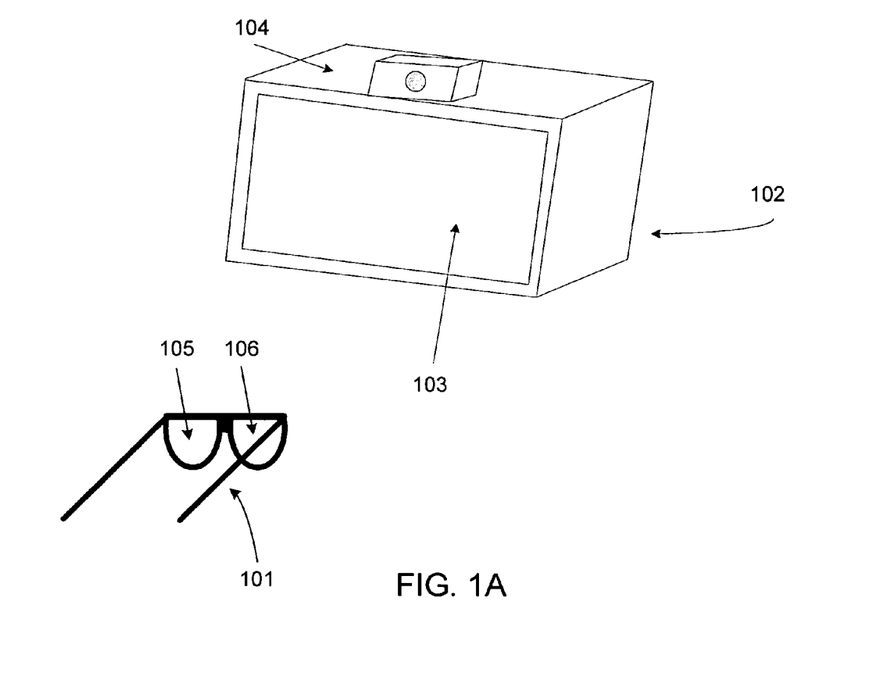
FIGS. 1A and 1B illustrate current display technology using shuttering eyewear.

FIG. 1A illustrates a stereoscopic display system representative of today's active shuttering eyewear solutions. In this system, CRT monitor 102 presents images for viewing using display screen 103 and an infrared emitter 104 for purposes of controlling the shuttering eyewear 101. Shuttering eyewear 101 may comprise StereoGraphics' CrystalEyes® active selection devices. In this illustration the selection devices construction employs liquid crystal shutters 105 and 106 for the left and right eyes, respectively. Although not shown in FIG. 1A, a video source supplies the CRT monitor 102 with image display information and also supplies synchronization information in the form of timing information based on the synchronization pulses within the blanking intervals of the video fields. Emitter 104, typically an infrared emitter or transmitter, broadcasts synchronization information with an unequivocal tag for the left- and right-eye signals to shuttering eyewear 101, which causes liquid crystal shutters 105 and 106 to shutter on and off in synchronization with the images transmitted from CRT monitor 102. Shuttering eyewear 101 incorporates a built-in infrared receiver, not shown in FIG. 1A.

The liquid crystal shutters 105 and 106 open and close in synchrony with the stereoscopic video field rate—when one shutter is open the other is closed. In this configuration, the infrared receiver within the shuttering eyewear 101 receives information relating the timing and duration of a field and information about the handedness, i.e. left or right perspective view, of the signal. The shuttering eyewear 101 uses this information to control the opening and closing of liquid crystal shutters 105 and 106. This enables the observer to view stereoscopic images by presenting a train of image fields for one eye viewing through liquid crystal shutter 105, and for the other eye through liquid crystal shutter 106. This configuration allows each eye to see an image half of the time. The shuttering eyewear 101 affects each eye's viewing time by sequencing the first shutter open while the second shutter is closed, followed by the first shutter closed while the second shutter is open. This sequencing technique results in only one eye being able to view an image at any given time, while occluding the other eye. If the sequence is repeated at a high enough field rate, an observer perceives either zero or minimal flicker and the image will be what is generally known as a "flicker-free" stereoscopic image.

FIG. 1B illustrates the construction of an electro-optical shutter mechanism typically found in currently available active eyewear selection devices only one part is shown since the construction is identical for both left and right shutters. The difference between the right shutter and left shutter is that they are simply run out of phase with one another. The electro-optical shutter 105' as shown in the drawing includes a pair of sheet polarizers at points 107 and 109 wherein the absorption axes are orthogonal, and positions a twisted nematic (TN) or super twisted nematic part 108 between the pair of polarizers. Such shutters may also be constructed using pi-cells rather than TN parts.

The twisted nematic or super twisted nematic part 108 behaves in a manner resembling an isotropic liquid and may be aligned by an external electrical field. A twisted nematic part can rotate the polarization axis orientation of the incoming light by 90 degrees. Light entering the TN device is polarized by the input filter, such as sheet polarizer 107. When no electric field is applied, the axis of polarization is toggled through 90 degrees by the TN device by means of the physics of optical activity and the light is therefore blocked by the output analyzer, such as sheet polarizer 109, oriented to be orthogonal to the input polarizer axis, 111. Either TN or super TN parts may be used, but super TN parts typically provide better switching time.

Applying an electric field to the twisted nematic device causes the directors to align in the same direction, perpendicular to the surface of the parts, and in this state the device is isotropic, there is no toggling of the polarization axis, and the device is transmissive. By switching between the two states, with and without field, a shutter or shutter effect is effectively produced. Electro-optical shutter construction shown at 105' may be identical to the parts shown in FIG. 1A at points 105 and 106. The electro-optical shutter 105' illustrated in FIG. 1B incorporates a sheet polarizer 107 with absorption axis 110 aligned orthogonal to absorption axis 111 of sheet polarizer 109. In the drawing, both absorption axes 110 and 111 are shown using double-headed arrows.

Arranging the front and rear sheet polarizer axes in an orthogonal configuration yields a higher dynamic range for a liquid crystal shutter part of this type than aligning the polarizers with axes parallel.

As noted, energizing the twisted nematic part 108 by applying a voltage potential causes the twisted nematic part 108 to become isotropic, resulting in occlusion. In the state where either a low-voltage or no-voltage potential is applied, the twisted nematic part 108 becomes optically transparent. The twisted nematic part 108 rotates the axis of polarization as described above. Therefore, by this means of electrically activating and deactivating twisted nematic part 108, it is possible to rapidly and repeatedly open and close shutters 105 and 106 as shown in FIG. 1A. In this way, the shuttering eyewear 101 may be controlled and synchronized using the field-sequential techniques as previously described. In practice, use of field sequential techniques and active shuttering eyewear produce suitable stereoscopic images when viewing a CRT monitor.

Another type of shuttering device may be used called a pi-cell (also known as a surface mode device). If a pi-cell is used, the shuttering effect, although the result is similar, operates in accordance with the physics of phase shifting. In the pi-cell the LC directors at the interior surfaces of the part are aligned to produce a phase shift sufficient to toggle the axis of the incoming light, as established by polarizer 109 using axis 111. In this case analyzer 107 with axis 110 blocks the transmission of light as described above in the case of the TN part. Although the effect is similar to the TN insofar as a shuttering device is thereby produced, the physics of the two devices, TN and pi-cell, are best explained as optical activity in the first case and phase shifting in the second. A phase shifting device has advantages when applied to analyzing circularly polarized light.

FIG. 2A illustrates a stereoscopic display system representative of currently available passive eyewear selection device solutions. CRT monitor 202 presents images for viewing on display screen 204, to which is affixed a liquid crystal modulator such as StereoGraphics Corporation's ZScreen®, shown in the drawing at point 203. The ZScreen is transparent, thus the frame in which it resides is illustrated. The ZScreen liquid crystal modulator implementation is well understood by those skilled in the art.

In the current design, the liquid crystal modulator 203 serves to change the characteristic of polarized light at the video field rate so that a sequence of left and right perspective fields having, in this case, alternating left- and right-handed circularly polarized light, are emitted by the monitor/modulator combination. The ZScreen encodes the left and right images with a polarization characteristic that can then be decoded by passive eyewear 201 using circularly polarizing analyzers 205 and 206. Circularly polarizing analyzers 205 and 206 are configured for the left and right eyes, respectively.

FIG. 2B affords a detailed look at the constituent elements of circular polarizing analyzers 205 and 206, shown here as 205' and 206' respectively. Polarizing analyzer 205' is made up of quarter wave retarder 206 whose axis is shown by double headed arrow 207. Linear polarizer component 208 has axis 209 shown by double headed arrow. Axis 207 is at 45 degrees to axis 209. This combination forms a circular polarizing filter of one handedness. Polarizing analyzer 206' is made up of quarter wave retarder 210 whose axis is shown by double headed arrow 211. Linear polarizer component 212 has axis 213 shown by double headed arrow. Axis 211 is at 135 degrees to axis 213. This combination forms a circular polarizing filter of the opposite handedness. Thus the two circularly polarized analyzers selectively admit the appropriate perspective image and block the inappropriate image so that eyewear, when worn using these filers, enable the user to see a stereoscopic image.

The field sequential stereoscopic display approaches illustrated in FIG. 1A with regard to active shuttering eyewear and in FIG. 2A with regard to passive eyewear both produce a quality stereoscopic image for viewing on a CRT monitor.

The present design, as described below, may be constructed using a liquid crystal monitor, or liquid crystal display, that replaces the CRT monitor found in previous designs. Liquid crystal monitors use polarization to vary image density and color. However, since liquid crystal monitors output polarized light, a significant loss in light intensity may result when combined with an electro-optical shutter such as the type shown in FIG. 1B at 105', which also uses a polarizer.

Figure 3:
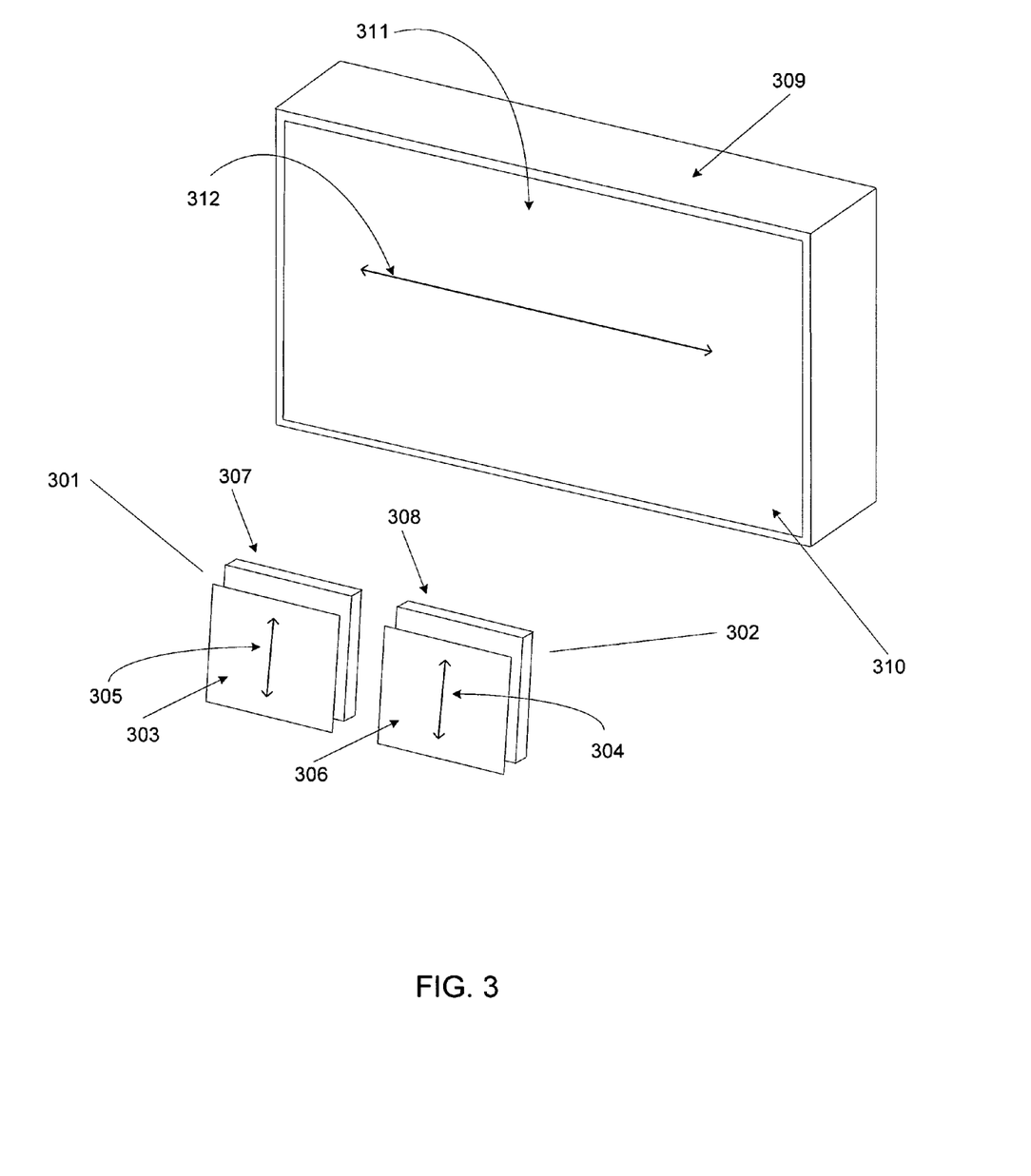
FIG. 3 illustrates a selection device using active eyewear with partial shutters in conjunction with a liquid crystal display monitor that outputs linear polarized light.

FIG. 3 illustrates a first embodiment of the present design that includes an active eyewear selection device with partial shutters in conjunction with a liquid crystal display. In this embodiment the liquid crystal display 309 outputs linearly polarized light from display surface 310. Sheet polarizer 311 covers display surface 310. The present design uses the sheet polarizer's absorption axis 312 in accordance with the double-headed arrow as shown in FIG. 3. The linear polarizer component is intrinsic to the monitor's ability to form an image and is part of the display or display product.

FIG. 3 also illustrates a left partial electro-optical shutter 301 and right partial optical-optical shutter 302. These are termed "partial" shutters because they require the polarized light from the display to function. In other words, component 311 works in concert with the partial shutters 301 and 302 to form a whole functional shutter. These two partial shutters may be constructed in a manner similar to optical shutter 105' as shown in FIG. 1B, with the exception that forward polarizer 109 is not employed. The optical shutter 105' is meant to be representative of a broader class of shutters that may be the form of liquid crystals but may also be of any number of other form factors or comprise any one of a variety of devices that performs the shuttering functionality described herein, and the optical shutter 105' and the constructions presented are in no way intended to limit the applicability of the present design. For example, and not by way of any limitation, they may be twisted nematic, pi-cell, ferroelectric or other type of part capable of performing the functionality described.

In the present design, construction of the left optical shutter 301 and right optical shutter 302 may be identical. The present design may configure the left optical shutter's linear polarizer 303 in an arrangement wherein the polarizer's axis 305 is aligned orthogonal to the sheet polarizer 311. Alignment is consistent with the axis direction represented by the double-headed arrow in the drawing and may provide the left-handed perspective view. The present design may incorporate a twisted nematic part 307, or similar part providing the functionality of a twisted nematic part, affixed to the linear polarizer 303. The present design may configure the right optical shutter's linear polarizer 306 such that the polarizer's axis 304 is aligned orthogonal to the alignment shown for sheet polarizer 311. This alignment is consistent with the axis direction represented by the double-headed arrow in the drawing and may provide the right-handed perspective view. A twisted nematic part 308, or a similar part providing the functionality of a twisted nematic part, may be affixed to the linear polarizer 306. The linear polarizers 303 and 306 may be provided in an orientation closest to the observer's eye. The various parts making up the left and right lens components may be positioned in shuttering eyewear similar to the eyewear 101 illustrated in FIG. 1A.

One specific advantage of the current design is therefore that the design does not require a second linear polarizer in front of or toward liquid crystal display 309 as part of the assembly. Linear polarizer 107 is not required, nor a second linear polarizer such as polarizer 208 or 212. The embodiment of FIG. 3 may provide the desired polarization axis 311 for each electro-optical shutter by using a sheet polarizer 310 affixed to the liquid crystal display monitor 309. The present design may energize the twisted nematic parts at 307 and 308 out of phase with respect to each other and in synchrony with the video field rate associated with the displayed images. Thus, the present design affords a functioning electro-optical shutter that utilizes the polarization state of the sheet polarizer 310.

In accordance with the present design, this embodiment may distribute the components and functionality between the active shuttering eyewear and the liquid crystal display. The method and system of the present design may provide a brighter image over currently known designs. Specifically, brightness increases using this design for the following reasons. CRT monitors are emissive devices that require the excitation of an electron beam impinging on phosphors to produce light on a pixel-by-pixel basis. Liquid crystal displays use a liquid crystal part between sheet polarizers to modulate light output, also on a pixel by pixel basis. The polarization property is intrusive to image formation and the polarization task passes to the eyewear designer. Embodiments of the present design avoid employing the front surface polarizer of the active shuttering parts. Accordingly, absorption of that polarizer is absent and light reaching the eyes increases appreciably, making the image appear brighter to the viewer. The major loss of light is no longer tied to the absorption characteristics of sheet polarizers, but is rather tied to the duty cycle that is part and parcel of all field sequential stereoscopic displays.

The orientation of the polarization axis 311 resulting from the use of sheet polarizer 310, illustrated as horizontal in FIG. 3, is not necessarily the only possible orientation. There is no uniformity or absolute requirement with regard to the direction of the external polarization axis. Monitors may have the outside polarization axis at any angle the manufacturer deems convenient. Accordingly, the polarization axes of the partial polarizer eyewear component must be oriented on a monitor by monitor basis (or monitor model or manufacturer basis) so as to be orthogonal to the display polarizer axis in order to have the highest dynamic range for the shutter.

Thus there can be embodiments of the present design that may include a sheet polarizer 310 that covers the liquid crystal display 309 surface having a polarization axis either parallel to the horizontal, orthogonal, oriented at 45 degrees, or oriented at some other angle. Therefore, the shuttering eyewear component of the present design may adjust the orientation of the polarizer axes at 305 and 306 to be arranged orthogonal to the liquid crystal display screen's polarization axis orientation.

When viewing images on a display screen implementing the present design's distributed or partial shutter method and system, only when viewing the display screen is there provided shuttering functionality, i.e. the eyewear is in fact on a part of the shutter. In this embodiment, the display screen only exhibits the required duty cycle when an observer is wearing partial shuttering eyewear operating in accordance with the discussion herein and as depicted in FIG. 3. In this arrangement, a shuttering effect may be encountered by an observer when viewing the display screen. The shuttering effect resulting from the displays duty cycle has no effect on the rest of the observer's visual field of view. This may enable the rest of the observer's visual field to remain considerably brighter than found in previous designs, a benefit resulting from no duty cycle. Costs savings result from no polarizer being affixed to the front surface of the optical shutters.

One desirable effect attributed to the present design may be realized when other non-stereoscopic or planar monitors are present in the field of view of the person using the display. In this situation, the other monitors will not be adversely affected by roll bars. The other monitors will, in all provability, not be synchronized or in phase with the liquid crystal display's field rate in the present design, thus making it difficult for an observer to view these other monitors. As the fields change they will be out of synch with the electro-optical shutters. The present design's electro-optical shutter components, conforming to the video field rate of the liquid crystal display, provides a quality stereoscopic image.

An additional desirable effect realized involves the ability to significantly lower the field rate, since there is no shuttering effect for the environment outside of the liquid crystal display screen. Experiments using stereoscopic display systems implemented in accordance with the present design show that the field rate may be lowered to approximately 90 fields per second, but other rates may be feasible. Shuttering eyewear based on previously known designs typically require the field rate to be approximately 120 fields per second in order to sufficiently mitigate environmental flicker. The present design's lower usable field rate may enable an increase in effective image resolution. Display devices are limited to a certain fixed bandwidth and only so many pixels per unit of time can be displayed. Therefore, the present design's ability to operate at a lower field rate enables generation of higher resolution images. Higher effective image resolution provides a significant advantage, especially for applications that involve measurement and close observation such as aerial mapping.

When any head tipping takes place by an observer wearing the partial shuttering or distributed polarizer eyewear as describe above in the first embodiment, crosstalk can be induced as an undesirable effect because of the use of linear polarization for image selection. When image selection uses linearly polarized light the Law of Malus applies. The Law of Malus relates the intensity I of linearly polarized light transmitted by a linear polarizer to both the intensity $I_0$, of the incident linear polarized light and the angle B between the axis of incident polarized light and the axis of the analyzer. The relationship between these quantities is shown in Equation (1):

$$I = I_0 * \cos^2(B) \quad (1)$$

A small change in the angle B therefore results in a large change in transmission intensity. As a result, a small amount of head tipping can lead to the loss of the stereoscopic effect when using linear polarizing eyewear to view a 3-D or stereoscopic movie only a little bit of head tipping—just a few degrees—results in crosstalk or in some situations a double image.

Therefore a cure is sought for the headtipping crosstalk problem. A second embodiment of the present design can eliminate the crosstalk associated with an observer's head tipping. The second embodiment of the present design may involve an onscreen switching method and a shutter that uses distributed polarizers.

Figure 4:
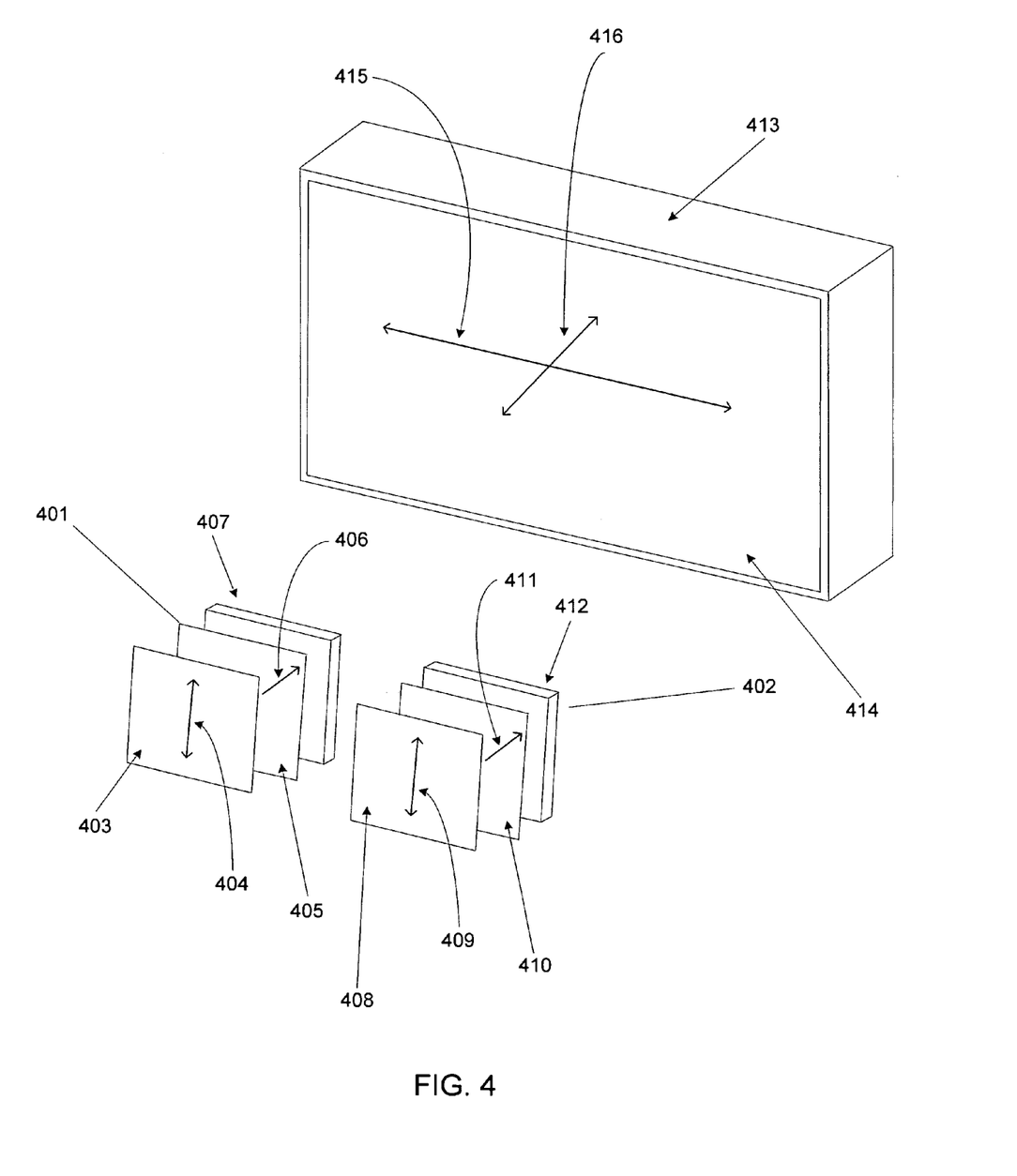
FIG. 4 illustrates a selection device using active eyewear with partial shutters in conjunction with a liquid crystal display monitor that outputs circularly polarized light.

The second embodiment of the present design is illustrated in FIG. 4. This embodiment incorporates a selection device using active partial shuttering eyewear with a liquid crystal display that outputs circularly polarized light. In this arrangement, the design may employ a liquid crystal display 413 with a linear polarizer integrated with the display surface 414, where the linear polarizer absorption axis 415 is aligned in accordance with the drawing. In addition, this arrangement may integrate a quarter-wave retarder with the display surface 414, where the quarter-wave absorption axis 416 is also aligned in accordance with the drawing. The absorption axis 416 of the quarter-wave retarder and the absorption axis 415 of the linear polarizer are oriented at 45 degrees in relationship to each other. This orientation may enable the liquid crystal display to output circularly polarized light. This arrangement may afford no diminution of image contrast or color because the quarter-wave retarder, oriented with absorption axis 416, is positioned on top of the linear polarizer 415.

Today's monitor manufacturers implement products that use orientations other than horizontal for the absorption axis of the linear polarizer. These implementations may align the absorption axis orthogonal to the horizontal, such as at 45 degrees or other arbitrary orientations. However, the present design and embodiment is not limited to the specific horizontal orientation shown for linear polarizer 415 in FIG. 4. The present design is more generally specified and is not restricted to the specific description provided herein with regard to FIG. 4. For example, the orientations provided with the various elements, i.e. the polarization directions, may differ from those shown, as may the construction of the individual components. The important point is that the retarder added to the front of the display has its axis oriented at 45 degrees to the axis of the polarizer.

FIG. 4 illustrates a left shutter component 401 and a right shutter component 402 that may be provided in the active eyewear of the present design. These shuttering components may provide a partial shutter functionality for use by an observer for viewing stereoscopic images on display surface 414. The electro-optical shutters may be driven in synchrony with the video field rate, but are out of phase with respect to each other. These two shutter components 401 and 402 may be of identical construction, and by operating them out of phase they provide the required shuttering effect for the train of left and right images.

Left shutter 401 may include a linear polarizer 403, aligned with its absorption axis 404 and represented by the double-headed arrow in the drawing. A quarter-wave retarder 405 may be aligned with its absorption axis 406 at 45 degrees in relation to absorption axis 404. In this arrangement, the present design may form a circular polarizer or analyzer for use in viewing stereoscopic images. The present design may include a liquid crystal phase-shifting or birefringent part 407 such as a surface-mode device or pi-cell.

Similarly, right handed shutter 402 may include a linear polarizer 408, and may be aligned with its absorption axis 409 at 45 degrees in relation to the absorption axis 411 of quarter-wave retarder 410.

The liquid crystal modulators at 407 and 412 employed in the present design may be realized best by using a surface-mode or the equivalent pi-cell devices. Energizing surface mode or pi-cell devices out of phase may provide the required shuttering effect for the train of left and right images. Constructing the selection device in this manner, the present design may form complete left and right optical shutters at points 401 and 402 that comprise all of the parts illustrated and in FIG. 4 when used in conjunction with the circular polarizer formed by liquid crystal display 413. Such a design may be formed by the addition of the quarter-wave retarder whose absorption axis 416 orientation and the linear polarizer whose absorption axis 415 orientation are aligned in accordance with FIG. 4.

Accordingly, by operating these partial electro-optical shutters at points 401 and 402 electrically out of phase, the present design may form an electro-optical effect of opening and closing the shutters so that the appropriate eye sees a train or a series of left and right images, and the inappropriate image is blocked or occluded. Configuring the present design with the absorption axes 404 and 409 of the linear polarizers orthogonal to the absorption axis 415 of the linear polarizer affixed at the liquid crystal display 413 may preclude the left eye from viewing the right images and visa versa.

The second embodiment of the present design may enable observer head tipping without increased crosstalk or ghosting as a result of using circular polarization for image selection. The distributed parts of the monitor, as shown in FIG. 4, form circular polarizing image selection devices. Because circularly polarized light is outputted by the monitor with the addition of the retarder, the orientation of the linear polarizer axes of the partial shutter analyzers is not as crucial as it might be in the case of linear polarization selection. Just so long as the rear retarder and polarizer remain oriented with their axes at 45 degress to each other, and similarly oriented in the most efficacious manner so as to optimize the pi-cells' electro-optical effect, the device operates adequately for monitors in any retarder orientation, and cross talk with head tipping is eliminated altogether or virtually nonexistent. Therefore the constraint given above with regard to the orientation of the parts' axes used in the partial shutters for linear selection does not apply, and eyewear can be supplied with universal characteristics insofar as the matching requirement created by the monitors' polarizer orientation.

All of the desirable effects that have been described with regard to the first embodiment as illustrated in FIG. 3, including duty cycle or shuttering effect for the non-monitor light, remain true for the second embodiment. When compared to an integral shutter method as previously described and illustrated in FIGS. 1A and 1B, the observed ambient light is very much brighter, where "ambient light" is considered as any non-monitor generated light. Moreover, any other monitors that are in the environment will are not subjected to duty cycle artifacts such as roll bars using this design. In addition, the second embodiment also allows for a higher resolution picture, because the concern with regard to ambient light flicker is similarly reduced. A lower field rate can be employed, as low as approximately 90 fields per second, which increases the number of pixels per unit of time that can be displayed.

What has been described here is a method and system of image selection for viewing a stereoscopic liquid crystal display that takes advantage of the fact that the liquid crystal display outputs circularly polarized light. In this manner, the present design may distribute the parts of an active shutter while retaining the advantages of the active shutter, which have been described above with regard to duty cycle and ambient light characteristics.

In addition, the distributed active shutter design may yield a very much lower cost of goods sold than previous designs constructed using an onscreen modulator. As shown previously in FIG. 2A, current designs require a liquid crystal modulator 203 comprising either a surface-mode device or pi-cell modulator. The modulators may become extremely expensive for large sizes. Beyond 19- or 20-inch monitors, the modulators become prohibitively costly. In contrast, the present design is relatively cost efficient. The present design may preserve many of the good characteristics of previously known onscreen modulation implementations, but without having the high cost associated with a very large pi-cell.

In today's market 23-inch and larger desktop monitors are becoming more and more popular. In addition, television sets typically are 40 inches or larger, and the method and system that has been described herein, although described in the context of scientific visualization applications, is applicable to a consumer television set—in which case pi-cell modulators or liquid crystal modulators of 40 to 60 inches would be prohibitively expensive. Thus, the present design may reduce the overall implementation costs associated with stereoscopic display systems.

A further embodiment addresses compatibly of shuttering eyewear used with TV sets or monitors having liquid crystal displays made by different manufacturers or within different factories and allows for the use of shuttering eyewear with shutters of conventional design rather than those that use partial shutters of shutters with distributed polarizers or retarders. The final image forming polarizer, outside polarizer, or in other words the polarizer facing the user, may have its axis oriented at different angles from monitor model to model and also based on the practices of different display manufacturers. Eyewear using the prescriptions given above would need to have the facing polarizers making up the shutters oriented accordingly, or in other words the polarizers would need to be aligned properly with respect to the shutters. Therefore different models of eyewear would be required, each style or model depending upon the polarizer axis orientation of the display. In point of fact this may be perfectly acceptable from a commercial point of view but a relatively universal alternative may provide more public acceptance and is described with regard to FIG. 5.

Figure 5:
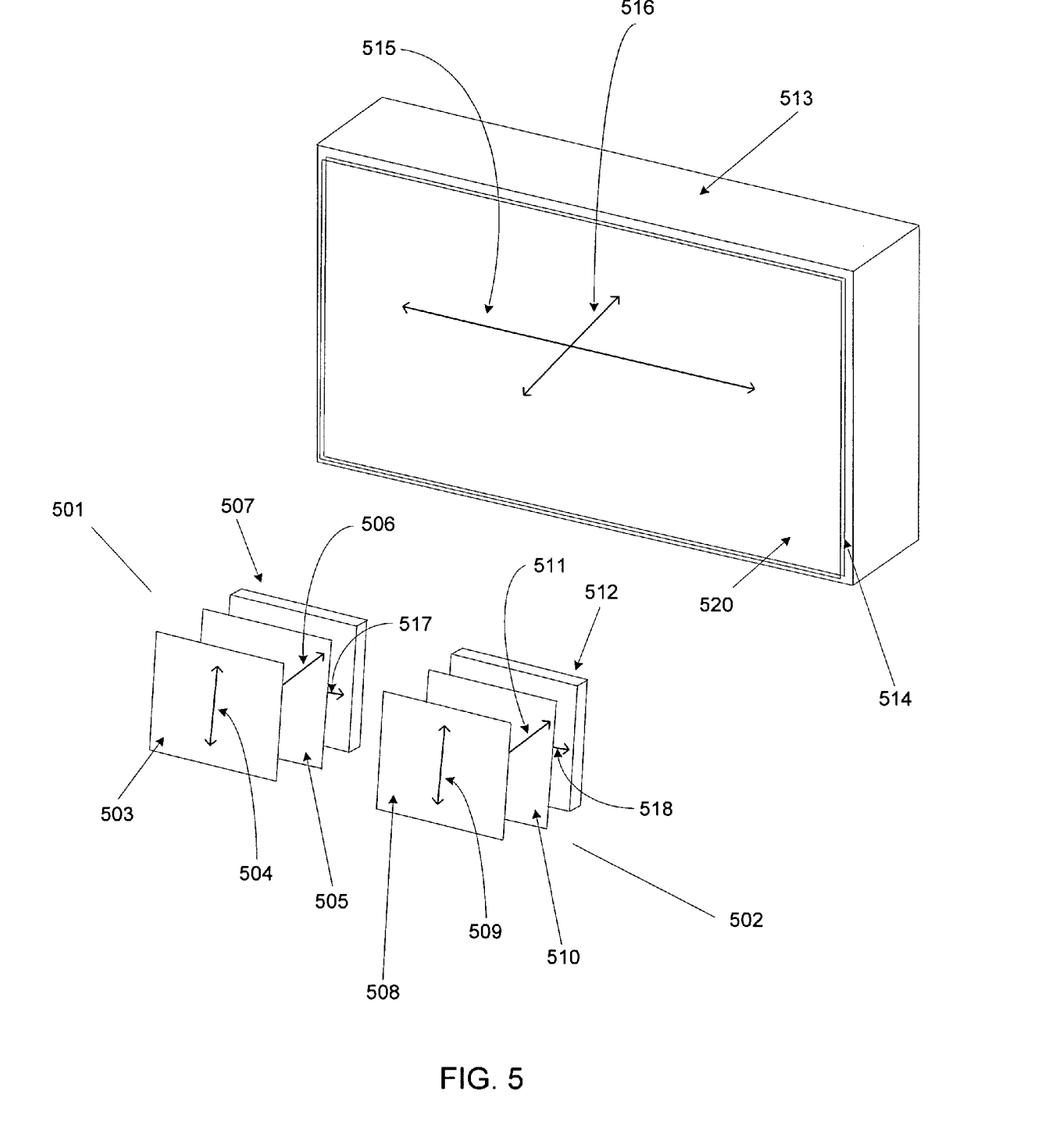
FIG. 5 illustrates a selection device using active eyewear with partial shutters in conjunction with a liquid crystal display monitor that outputs circularly polarized light.

The embodiment of FIG. 5 maintains the shuttering duty cycle for non-monitor viewing, leading to two results: The field rate needs to be higher to reduce or eliminate ambient non-monitor flicker, and when viewing non-synchronized monitors, roll bars may be visible, especially for planar monitors. This embodiment uses a relatively simple modification to the display screen that in turn allows present shuttering eyewear to be used without the kinds of eyewear modifications that have been described above.

In FIG. 5, the active eyewear, generally unchanged from the configuration described above with respect to FIGS. 1A and 1B, is employed in conjunction with a liquid crystal display. To be precise, the shutters employed in active eyewear are delineated or called out in FIG. 5. Left shutter 501 is made up of front polarizer 507 whose axis is depicted as axis 517. Twisted nematic, or similar liquid crystal device such as a pi-cell, is shown as element 505 with rub axis 506. Rear polarizer 503 has axes 504. The front and rear polarizer axes are orthogonal as is typical in this type of shutter design, but other arrangements are possible. For example the polarizer axes may be parallel but with less optical efficiency with regard to dynamic range.

The display monitor 513 has screen surface 514 covered with a linear polarizer whose axis is given by 515 and quarter wave retarder 520, with axis 515 overlaying the linear polarizer. Quarter wave retarder 520 may have, for example, a value of approximately that of the mid point of the visible spectrum, or about 550 nanometers. The axis 516 for quarter wave retarder is positioned at a 45 degree angle to the linear polarizer axis 515. Together these two components form a circular polarizing filter. The relative orientation of the circular polarizer retarder and polarizer is immaterial in that the axes 515 and 516 can be reoriented at any angle so long as they remain fixed at 45 degrees with respect to each other. The angle may be more or less than 45 degrees by some small amount and still provide the beneficial effects described herein.

Right shutter 502 includes front polarizer 512 whose axis is depicted as element 518. Twisted nematic cell 510, or a similar liquid crystal device, is shown having rub axis 511. Rear polarizer 508 has axis 509. The front and rear polarizer axes are orthogonal as is typical in this type of shutter, but other arrangements are possible, such as where the polarizer axes are parallel. Left shutter 501 includes front polarizer 507 whose axis is depicted as element 517. Twisted nematic cell 505, or similar liquid crystal device, is shown having rub axis 506. Rear polarizer 503 has axis 504. The front and rear polarizer axes are orthogonal as is typical in this type of shutter, but other arrangements are again possible, such as where the polarizer axes are parallel.

The display arrangement, including display monitor 513, polarizing screen surface 514, and quarter wave retarder 520, outputs circularly polarized light. However, the image of the display, its color and density having been formed by the linear polarizer associated therewith, is unchanged. The addition of the quarter wave retarder 520 keeps the circularly polarized light from being analyzed by the front linear polarizing filters 507 and 512 of left and right shutters 501 and 502, respectively, of the active eyewear. Since the circularly polarized light cannot be analyzed or properly displayed to a viewer using the shutters of the active eyewear, the active eyewear functions properly when the front surface polarizers of the shutters are in place. Thus the only addition to the display is that of a quarter wave retarder 520 properly oriented with respect to the display's image forming polarizer, that is to say their axes are at 45 degrees, to maintain compatibility with active shuttering eyewear.

Retarder sheets can be added to the front surfaces of the shutter elements of the eyewear, or the surfaces facing the display screen. Retarders of the proper value and orientation will have a similar effect when added to the eyewear shutters as described above as when added to the monitor surface, but head tipping again becomes an issue since the orientation of the retarder is now tied to head tilt orientation. Nevertheless such a modification has the virtue of being far less expensive since less retarder material is required.

The designs presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

In particular, other combinations of sheet polarizers and/or retarders may be efficacious. Such variations on the embodiments discussed herein are apparent once the principal of distribution of the parts of the shutter and the concept of the partial shutter are understood.

What is claimed is:

1. An eyewear system for viewing stereoscopic images, comprising:
    a display having a sheet polarizer covering a display surface of the display, said display configured to transmit light energy through the sheet polarizer emitting polarized light energy, said sheet polarizer having a first axis of polarization, the polarized light energy having first polarization characteristics upon exiting the sheet polarizer; and
    eyewear comprising:
        polarization altering elements configured to receive the polarized light energy having first polarization characteristics from the sheet polarizer and rotate the polarization of the polarized light energy received from the sheet polarizer passing therethrough; and
        linear polarizers having polarization axes oriented in substantially identical orientations orthogonal to the first axis of polarization,
        wherein said linear polarizers receive light energy from the polarization altering elements.

2. The system of claim 1, wherein the polarization altering elements comprise two polarization altering elements, each operating out of phase with the other and in synchrony with a video field rate associated with the display and sheet polarizer.

3. The system of claim 1, wherein the polarization altering elements comprise twisted nematics.

4. The system of claim 1, wherein the polarization altering elements comprise super twisted nematics.

5. The system of claim 1, wherein the display comprises a liquid crystal display.

6. The system of claim 1, further comprising additional linear polarizers interposed between the polarization altering elements and the linear polarizers, wherein said additional linear polarizers having polarization axes substantially uniformly oriented and materially different from the substantially identical orientations of the linear polarizers.

7. The system of claim 1, wherein the display further has a quarter wave retarder associated therewith, and wherein the polarization altering elements are configured to receive the polarized light energy having first polarization characteristics from the sheet polarizer and the quarter wave retarder.

8. A stereoscopic image viewing system comprising:
    a display having a sheet polarizer covering a display surface of the display, said display configured to transmit light energy through the sheet polarizer emitting polarized light energy, said sheet polarizer having a first axis of polarization, the polarized light energy having first polarization characteristics upon exiting the sheet polarizer; and
    eyewear configured for viewing stereoscopic images, comprising:
        polarization altering elements configured to receive the polarized light energy having first polarization characteristics and rotate the polarization of the polarized light energy passing therethrough; and
        linear polarizers having polarization axes oriented in substantially identical orientations orthogonal to the first axis of polarization,
        wherein said linear polarizers receive light energy from the polarization altering elements.

9. The system of claim 8, wherein the polarization altering elements comprise two polarization altering elements, each operating out of phase with the other and in synchrony with a video field rate associated with a display arrangement.

10. The system of claim 8, wherein the polarization altering elements comprise twisted nematics.

11. The system of claim 8, wherein the polarization altering elements comprise super twisted nematics.

12. The system of claim 8, further comprising additional linear polarizers interposed between the polarization altering elements and the linear polarizers, wherein said additional linear polarizers having polarization axes substantially uniformly oriented and materially different from the substantially identical orientations of the linear polarizers.

13. A method for viewing stereoscopic images, comprising:
    transmitting light energy through a sheet polarizer covering a display surface of a display for emitting polarized light energy, the sheet polarizer having a first axis of polarization, the light energy having first polarization characteristics upon exiting the sheet polarizer;
    receiving the polarized light energy having first polarization characteristics with two polarization altering elements to emit altered light energy, each polarization altering element operating out of phase with the other and in synchrony with a video field rate associated with the transmitting; and
    passing the altered light energy through two linear polarizers having substantially identical axes of polarization orthogonal to the first axis of polarization.

14. The method of claim 13, wherein the polarization altering elements comprise twisted nematics.

15. The method of claim 13, wherein the polarization altering elements comprise super twisted nematics.

16. The method of claim 13, further comprising providing the altered light energy to additional linear polarizers interposed between the polarization altering elements and the linear polarizers, wherein said providing occurring subsequent to said receiving, and said additional linear polarizers having polarization axes substantially uniformly oriented and materially different from the substantially identical axes of orientation of the linear polarizers.

17. The method of claim 13, further comprising:
    passing the polarized light energy having first polarization characteristics through a quarter wave retarder to emit circularly polarized light energy; and
    passing the circularly polarized light energy through front polarizers prior to receiving the polarized light energy having first polarization characteristics with two polarization altering elements.

18. A method for viewing field sequential stereoscopic images, comprising:

outputting linear polarized light from a display surface of a liquid crystal display configured with a sheet polarizer disposed on the display surface to form field sequential stereoscopic images, said sheet polarizer having a first axis of polarization, the linear polarized light having first polarization characteristics upon exiting the sheet polarizer; and observing left and right image information through a pair of optical shutters each configured with a linear polarizer and a twisted nematic part to form an active eyewear selection device, each linear polarizer having a polarization axis oriented in substantially identical orientations orthogonal to the first axis of polarization, wherein the twisted nematic part receives linear polarized light having first polarization characteristics;

wherein said images and optical shutters are synchronized at the field rate associated with the field sequential stereoscopic images.

19. The method of claim 18, further comprising passing the polarized light having first polarization characteristics through a quarter wave retarder to emit circularly polarized light; and passing the circularly polarized light through front polarizers prior to observing left and right image information through the pair of optical shutters.

20. The method of claim 18, further comprising energizing the twisted nematic part by applying a voltage thereby occluding light from passing therethrough.

21. Eyewear for viewing stereoscopic images transmitted from a display having a sheet polarizer with a first axis of polarization, wherein light energy exiting the sheet polarizer has first polarization characteristics, the eyewear comprising:
   a left lens comprising:
      a first polarization altering element configured to receive light energy having first polarization characteristics and to selectively rotate the polarization of the light energy passing therethrough; and
      a first linear polarizer having a polarization axis oriented substantially orthogonal to the first axis of polarization; and
   a right lens comprising:
      a second polarization altering element configured to receive light energy having first polarization characteristics and to selectively rotate the polarization of the light energy passing therethrough; and
      a second linear polarizer having a second polarization axis oriented in a substantially identical orientation as the first linear polarizer.

22. The eyewear of claim 21, wherein the first and second polarization altering elements each operate out of phase with each other and in synchrony with a video field rate associated with the display and sheet polarizer.

23. The eyewear of claim 21, wherein the first and second polarization altering elements comprise two polarization altering elements, each operating out of phase with the other and in synchrony with a video field rate associated with a display arrangement.

24. The eyewear of claim 21, wherein the first and second polarization altering elements comprise twisted nematics.

25. The eyewear of claim 21, wherein the first and second polarization altering elements comprise super twisted nematics.

26. The eyewear of claim 21, further comprising additional linear polarizers interposed between the first polarization altering element and the first linear polarizer, and between the second polarization altering element and the second linear polarizer, wherein said additional linear polarizers have polarization axes substantially uniformly oriented and materially different from the substantially identical orientations of the first and second linear polarizers.

* * * * *